(12) United States Patent
Hunt

(10) Patent No.: US 10,789,728 B2
(45) Date of Patent: Sep. 29, 2020

(54) MACHINE LEARNING FRAMEWORK FOR VISUAL TRACKING

(71) Applicant: DENSO International America, Inc., Southfield, MI (US)

(72) Inventor: Shawn Hunt, Pinckney, MI (US)

(73) Assignee: DENSO INTERNATIONAL AMERICA, INC., Southfield, MI (US)

( * ) Notice: Subject to any disclaimer, the term of this patent is extended or adjusted under 35 U.S.C. 154(b) by 211 days.

(21) Appl. No.: 16/192,137

(22) Filed: Nov. 15, 2018

(65) Prior Publication Data

US 2020/0160550 A1    May 21, 2020

(51) Int. Cl.
| | |
|---|---|
| *G06T 7/70* | (2017.01) |
| *G06K 9/00* | (2006.01) |
| *G06K 9/46* | (2006.01) |
| *G05D 1/02* | (2020.01) |
| *G06N 20/00* | (2019.01) |

(52) U.S. Cl.
CPC .............. *G06T 7/70* (2017.01); *G05D 1/0221* (2013.01); *G05D 1/0246* (2013.01); *G06K 9/00805* (2013.01); *G06K 9/00825* (2013.01); *G06K 9/4604* (2013.01); *G06N 20/00* (2019.01); *G05D 2201/0213* (2013.01); *G06T 2207/10016* (2013.01); *G06T 2207/30252* (2013.01)

(58) Field of Classification Search
CPC .. G06T 7/70; G06K 9/00825; G06K 9/00791; G06N 5/003; G06N 3/126
See application file for complete search history.

(56) References Cited

U.S. PATENT DOCUMENTS

| | | | |
|---|---|---|---|
| 8,903,128 B2 | 12/2014 | Shet et al. | |
| 2003/0235327 A1* | 12/2003 | Srinivasa | G06K 9/00805 382/104 |
| 2015/0332114 A1* | 11/2015 | Springer | B60W 50/14 348/148 |
| 2018/0075309 A1 | 3/2018 | Sathyanarayana et al. | |
| 2018/0149487 A1* | 5/2018 | Lee | G06T 7/20 |

(Continued)

OTHER PUBLICATIONS

Olague et al., Evolutionary-computer-assisted design of image operators that detect interest points using genetic programming, Image and Vision Computing, Journal, Published Mar. 22, 2011, 484-498, Mexico, 15 pages.

(Continued)

*Primary Examiner* — King Y Poon
*Assistant Examiner* — Michael Burleson
(74) *Attorney, Agent, or Firm* — Brooks Kushman P.C.

(57) ABSTRACT

A method of analyzing autonomous vehicle data comprising recording a video of a vehicle environment utilizing one or more vehicle cameras, identifying corner points of objects in the video, identifying a forward-tracked location of one or more corner points in each frame from an earlier frame to a later frame of the recorded video played in forward, identifying a reverse-tracked location of one or more corner points in each frame from the later frame to the earlier frame of the recorded video played in reverse, comparing the forward-tracked location of the earlier frame and reverse-tracked location of the later frame, and adjusting a descriptor defining characteristics of one or more pixels of the corner point in response the comparison indicating an error rate exceeding a threshold.

20 Claims, 3 Drawing Sheets

(56) References Cited

U.S. PATENT DOCUMENTS

2018/0365843 A1\* 12/2018 Cheng ................ G06K 9/00718
2019/0258251 A1\* 8/2019 Ditty ................. G06K 9/00805

OTHER PUBLICATIONS

Kurdej, Exploitation of map data for the perception of intelligent vehicles, HAL archives-ouvertes.fr, Thesis, Feb. 2015, Heudiasyc, Universite de Technologie de Compiegne, France, 177 pages.
Price et al., Genetic Programming for Image Feature Descriptor Learning, IEEE Congress on Evolutionary Computation (CEC), Jun. 5-8, 2017, Department of Electrical and Computer Engineering, Mississippi State University, 7 pages.

\* cited by examiner

MACHINE LEARNING FRAMEWORK FOR VISUAL TRACKING

TECHNICAL FIELD

The present disclosure relates to visual odometry that utilizes computer vision to calculate a vehicle's trajectory.

BACKGROUND

Visual odometry may use computer vision to calculate a vehicle's trajectory. Visual odometry may be the process of calculating a vehicle's trajectory as it moves through its environment using a camera. It may be important to use visual odometry in an area where GPS signals are disturbed or unavailable, such as in tunnels or urban canyons.

SUMMARY

According to one embodiment, an autonomous vehicle comprises a sensor configured to record video and identify one or more objects utilizing proximity data, and a controller in communication with the sensor and configured to perform the following functions of identifying corner points in the recorded video of one or more objects utilizing the proximity data, identifying a forward-tracked location of one or more corner points in each frame from a first frame to a last frame of the recorded video played in forward, identifying a reverse-tracked location of one or more corner points in each frame from the last frame to the first frame of the recorded video played in reverse, comparing the forward-tracked location and reverse-tracked location of the one or more corner points, and adjusting a descriptor defining characteristics of one or more pixels of the corner point in response to the comparison indicating an error rate exceeding a threshold.

According to a second embodiment, a method of analyzing autonomous vehicle data is disclosed comprising recording a video of a vehicle environment utilizing one or more vehicle cameras, identifying corner points of objects in the video, identifying a forward-tracked location of one or more corner points in each frame from an earlier frame to a later frame of the recorded video played in forward, identifying a reverse-tracked location of one or more corner points in each frame from the later frame to the earlier frame of the recorded video played in reverse, comparing the forward-tracked location of the earlier frame and reverse-tracked location of the later frame, and adjusting a descriptor defining characteristics of one or more pixels of the corner point in response the comparison indicating an error rate exceeding a threshold.

According to a third embodiment, a computer system comprises a storage medium including a recorded video collected from one or more vehicle sensors configured to identify one or more objects utilizing proximity data and a processor in communication with the storage medium and programmed to identify corner points in the recorded video of the one or more objects utilizing the proximity data, play the recorded video in forward and reverse, identify a forward-tracked location of one or more corner points in a first frame when the recorded video is played in forward from a first frame to a last frame, identify a reverse-tracked location of one or more corner points in the first frame when the recorded video is played in reverse from the last frame to the first frame, compare the forward-tracked location and reverse-tracked location of the one or more corner points, and adjust a descriptor defining a pixel of the corner point in response the comparison indicating a change of position of the one or more corner points.

DETAILED DESCRIPTION

Figure 1:
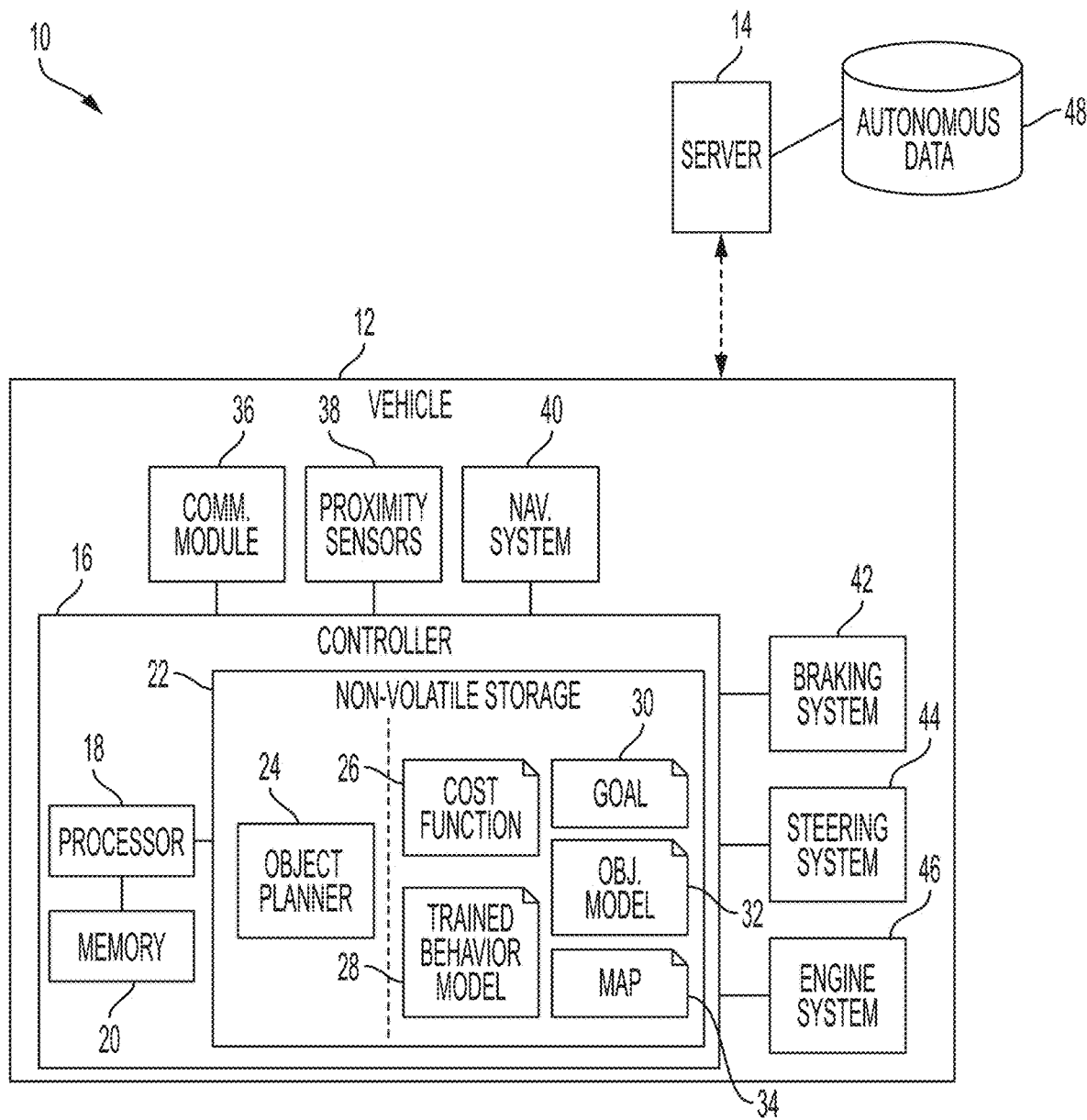
FIG. 1 illustrates a system 10 for implementing an autonomous driving system configured to generate a driving plan for an autonomous vehicle.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Visual odometry may use computer vision to calculate a vehicle's trajectory. Visual odometry may be the process of calculating a vehicle's trajectory as it moves through its environment using a camera. It may be important to use visual odometry in an area where GPS signals are disturbed or unavailable, such as in tunnels, urban canyons, etc. A vehicle may need to only use a camera to detect a vehicle's location because the sensor is relatively inexpensive and is able to operate in areas where GPS has issues. For example, cameras may be considered passive sensing while radar/lidar are "active." As such, active sensing sensors such as radar/lidar may both emit a signal and measure the return of the signal in order to calculate distance. Passive sensors may be used in order for people to have difficulty in detecting the use of the passive sensor, such as in a military application. It may be beneficial to develop a process that may be utilized in both highway and urban environments to use for verification of visual odometry. A development process and verification scheme for such scenarios may be improve autonomous driving.

Idempotence may be utilized to improve autonomous driving. Idempotence is a mathematical term that states that certain operations can be applied multiple times without changing the result. In the case of feature tracking, software may be utilized to read in a dataset of previously recorded video data. The feature tracking may be started at a given frame then tracked for an N number of frames. The N number of frames may be designated by the user. The pixel coordinates of each point in the first frame may be saved off. Once the Nth frame has been reached, the tracking may continue in reverse back to the first frame. Once the first frame has been reached, the current pixel locations are again taken and compared to the pixel coordinates that were originally saved off. The tracking algorithm's performance can then be measured by the error between the points when tracking ended and when it began. Points that have exactly the same coordinates as when tracking started as when it ended may have no error. Additionally, the use of genetic programming may be utilized to develop a new descriptor for the algorithm to track. Based on the feedback from the idempotency test, the error value may be utilized and the descriptor may be mutated and tried again if the error rate has exceeded a threshold.

FIG. 1 illustrates a system 10 for implementing an autonomous driving system configured to generate a driving plan for an autonomous vehicle. The system 10 may include an autonomous vehicle 12 and a remote server 14. The vehicle 12 may wirelessly communicate with the remote server 14 via one or more networks, such as one or more of the Internet, a local area network, a wide area network, and a cellular network.

The vehicle 12 may include a controller 16. The controller 16 may be a vehicle controller, such as an electronic control unit ("ECU"). The controller 16 may be configured to implement the planning-based approach and/or the learning-based approach described herein. In other words, the controller 16 may be configured to plan the operation of other vehicles traveling proximate the vehicle 12, and to control the vehicle 12 based thereon.

The controller 16 may include a processor 18, memory 20, and non-volatile storage 22. The processor 18 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 20. The memory 20 may include a single memory device or a plurality of memory devices including, but not limited to, random access memory ("RAM"), volatile memory, non-volatile memory, static random-access memory ("SRAM"), dynamic random-access memory ("DRAM"), flash memory, cache memory, or any other device capable of storing information. The non-volatile storage 22 may include one or more persistent data storage devices such as a hard drive, optical drive, tape drive, non-volatile solid-state device, or any other device capable of persistently storing information.

The processor 18 may be configured to read into memory 20 and execute computer-executable instructions embodying one or more software programs, such as an object planner 24, residing in the non-volatile storage 22. The object planner 24 may be part of an operating system or an application, and may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. The computer-executable instructions of the object planner 24 may be configured, upon execution by the processor 18, to cause the controller 16 to implement the object planner 24, and correspondingly to implement functions, features, and processes of the object planner 24 described herein.

The non-volatile storage 22 may also include data utilized by the controller 16, or more particularly by the object planner 24, when implementing the functions, features, and processes of the controller 16 described herein. For example, the non-volatile storage 22 may include cost function data 26, trained behavior model data 28, goal data 30, object model data 32, and map data 34, each of which may enable the object planner 24 to predict behaviors of other objects proximate the vehicle 12. The cost function data 26 may define one or more cost functions, each which may map a candidate trajectory for a proximate object to a cost value to the object for taking the trajectory. The trained behavior model data 28 may define one or more trained behavior models, each which may be configured to predict the future behavior of a given proximate object based on a data set of previously observed object behaviors and current observations of the proximate object. The goal data 30 may define goals for various objects given a particular travel context (e.g., highway road, city road, object class such as passenger vehicle, motorcycle, semi-truck, bicycle, pedestrian, or non-moving object in the road). The object model data 32 may define one or more object models, which may set forth the dynamics for various object classes. The map data 34 may define travel infrastructure details by location.

The non-volatile storage 22 may also include one or more database structures for collecting, organizing, and enabling fast retrieval of the data stored therein. For example, the stored data may be arranged in one or more relational databases, one or more hierarchical databases, one or more network databases, or combinations thereof. A database management system in the form of computer software executing as instructions on the processor 18 may be used to access the information or data records of the databases in response to a query, which may be dynamically determined and executed by the object planner 24.

The controller 16 may communicate with other components of the vehicle 12, such as a communications module 36, various proximity sensors 38, a navigation system 40, a braking system 42, a steering system 44, and an engine system 46. The controller 16 may be directly connected to one or more of these other components, such as via various input/output (I/O) ports of the controller 16. Additionally, or alternatively, the controller 16 may communicate with one or more of these other components over one or more in-vehicle networks, such as a vehicle controller area network (CAN), an Ethernet network, a media oriented system transfer (MOST) network, and a wireless local area network (WLAN).

The communications module 36 may be configured to facilitate wireless communication between the vehicle 12 components and other devices and systems external to the vehicle 12, such as the remote server 14, using radio frequency (RF) transmissions. For example, the communications module 36 may include a cellular modem or other wireless network transceiver (e.g., Wi-Fi transceiver) configured to communicate with the remote server 14 over one or more networks, such as one or more of the Internet, a local area network, a wide area network, and a cellular network to which the cellular modem is subscribed. The controller 16 may communicate with the remote server 14 by accessing the communication capabilities of the communications module 36.

The communications module 36 may also include one or more wireless transceivers configured to facilitate direct wireless communication with other devices and systems, such as a personal computer device or key fob, when such other devices and systems are local to (e.g., within direct wireless communication range of) the vehicle 12. To facilitate such local wireless communications, the communications module 36 may include a Bluetooth transceiver, a ZigBee transceiver, a Wi-Fi transceiver, a radio-frequency identification ("RFID") transceiver, a near-field communication ("NFC") transceiver, a vehicle-to-vehicle (V2V) transceiver, a vehicle-to-infrastructure (V2I) transceiver, and/or transceivers designed for other RF protocols particular to remote services provided by the vehicle 12 (e.g., keyless entry, remote start, passive entry passive start).

The proximity sensors 38 may be configured to detect objects proximate to the vehicle 12, and to correspondingly generate proximity data indicative of the current operating state of such objects. For example, the proximity sensors 38 may be configured to detect the existence of other vehicles, lane lines, guard rails, objects in the roadway, buildings, and pedestrians within a particular distance of the vehicle 12. The proximity sensors 38 may be configured to communicate the generated proximity data to the to the controller 16, which may be configured to interpret the proximity data to derive the operating state of each detected proximate object. For example, the controller 16 may be configured to identify a pose for each proximate object, which may indicate the position and orientation of each object relative to the vehicle 12 (e.g., angle and distance). The controller 16 may also be configured to identify movement information for each proximate object (e.g., speed, velocity, acceleration), and a class for each proximate object (e.g., passenger vehicle, truck, motorcycle, pedestrian, bicycle). The controller 16 may then be configured to utilize the operating state of each proximate object to plan an operation for the object, such as slowing down or switching lanes, and to control operation of the vehicle 12 based on the planned operation.

As an example, the proximity sensors 38 may include one or more LIDAR sensors. The LIDAR sensors may each be configured to measure a distance to an object external and proximate to the vehicle 12 by illuminating the target with a pulsed laser light and measuring the reflected pulses with a sensor. The LIDAR sensors may then measure the differences in laser return times and, based on these measured differences and the received wavelengths, may generate a digital 3-D representation of the object. The LIDAR sensors may further have the ability to classify various objects based on the 3-D rendering of the object. For example, by determining a shape of the target, the LIDAR sensors may classify the object as a passenger vehicle, motorcycle, truck, curb, roadblock, building, pedestrian, and so on. The LIDAR sensors may work in conjunction with other vehicle components, such as the controller 16 and other proximity sensors 38, to classify various objects outside of the vehicle 12. The LIDAR sensors may include laser emitters, laser receivers, and any other suitable LIDAR autonomous vehicle sensor components. The LIDAR sensors may further be arranged within a housing configured to rotate to facilitate scanning of the environment.

As another example, the proximity sensors 38 may include one or more cameras for capturing images of the environment surrounding the vehicle 12. For example, the proximity sensors 38 may include a forward-facing camera that is mounted to the rear-view mirror of the vehicle 12 and is configured to collect image data of the environment in front of the vehicle 12. Similarly, the proximity sensors 38 may include a rear-facing camera that is mounted to the trunk of the vehicle 12 and is configured to collect image data of the environment behind the vehicle 12, and may include side-facing cameras that are mounted to the side view mirrors of the vehicle 12 and are configured to collected image data of the environment to each side of the vehicle 12. The controller 16 may be configured to process the image data captured by the one or more cameras of the vehicle 12 to identify conditions around the vehicle 12, including, for example, the position of lane markers, the existence of traffic symbols, and the existence and operating state of other objects proximate the vehicle 12. The controller 16 may be configured to identify such conditions by comparing the location and color of pixels within the image data to prestored templates associated with various conditions.

As additional examples, the proximity sensors 38 may include one or more radar sensors, one or more ultrasonic sensors, and/or any other sensors for detecting information about the surroundings of the vehicle 12. The sensors may be mounted anywhere on the vehicle. For example, a proximity sensor 38 may be mounted on a roof of the vehicle 12 so as to have a three hundred sixty-degree view of the environment surrounding of the vehicle 12. Additionally, or alternatively, various proximity sensors 38 may surround the vehicle 12 to provide a three hundred sixty-degree view of the vehicle 12. The vehicle 12 may include actuators for adjusting an angle of the field of view of the various proximity sensors 38.

The navigation system 40 may be configured to generate geographic data for the vehicle 12, such as via communicating with one or more satellites orbiting Earth. The geographic data may indicate a current geographic location of the vehicle 12, such as by including current longitude and latitude coordinates of the vehicle 12. As some non-limiting examples, the navigation system 40 may include one or more of a Global Positioning System (GPS) module, a Quazi-Zenith Satellite System (QZSS) module, a Russian Global Navigation Satellite System (GLONASS) module, a Galileo System (GSNN) module, an Indian Regional Navigation Satellite System (IRNSS) module, and an inertial navigation system (INS) module.

The navigation system 40 may communicate the geographic data to the controller 16, which may be configured to utilize the geographic data to determine the geographic location of the vehicle 12, and to correspondingly determine the geographic location of detected proximate objects. The vehicle 12 may also include a gyroscope or compass configured to indicate a current heading of the vehicle 12, which the controller 16 may combine with the geographic data to produce data indicating the current location and heading of the vehicle 12. Alternatively, the controller 16 may determine the heading of the vehicle 12 based on received geographic data indicating a changed position of the vehicle 12 over a short time span (e.g., one second), which suggests that the vehicle 12 is moving in a direction corresponding to the change in position.

The controller 16 may be configured to query the map data 34 based on the geographic data to identify information about the travel infrastructure currently in use by the vehicle 12. In particular, the map data 34 may include detailed information about travel infrastructure in various geographic locations, such as road type (e.g., highway, city), road properties (e.g., one way, multi-lane, slope information, curvature information), detailed lane information (e.g., location, dimensions, restrictions such as no passing, turn-only, and traffic direction), and the locations and dimensions of curbs, sidewalks, traffic signals, traffic signs, and crosswalks relative to a road, as some non-limiting examples. Alternatively, the controller 16 may be configured to derive at least some of this information from proximity data generated by the proximity sensors 38, such as via processing image data captured by cameras of the vehicle 12.

Responsive to receiving the geographic data from navigation system 40, the proximity data from the proximity sensors 38, and the map data 34 corresponding to the received geographic data, the controller 16 may identify the position of each detected proximate object within the currently used travel infrastructure, which may also be part of the determined operating state for each object. Specifically, the controller 16 may be configured to determine the location of the vehicle 12 within travel infrastructure based on the geographic data, the map data 34, and/or the received proximity data, including which lane of the travel infrastructure the vehicle 12 is currently located. The controller 16 may then be configured to identify the location of each detected proximate object within the currently used travel infrastructure based on the relative position of each proximate object, as indicated in the proximity data, and the map data 34. For example, if the detailed lane information included in the map data 34, or the proximity data, indicates that a particular lane is located a given distance away from the current position of the vehicle 12, and the proximity data indicates that a detected proximate object is located alongside the vehicle 12 at a distance from the vehicle 12 equal to the given distance, then the controller 16 may be configured to determine that the proximate vehicle is traveling in the given lane.

The braking system 42, steering system 44, and engine system 46 may control movement of the vehicle 12, such as at the direction of the controller 16. In particular, the controller 16 may be configured to plan an operation for each detected proximate object based on the determined operating state for each object, and may then be configured to generate a driving plan for the vehicle 12 that avoids a collision with any of the detected proximate objects assuming they act according to the planned operations. Thereafter, the controller 16 may be configured to cause the vehicle 12 to operate according to the driving plan by transmitting corresponding control signals to the braking system 42, the steering system 44, and the engine system 46. For example, the controller 16 may transmit a control signal to the braking system 42 to slow down or stop the vehicle 12, may transmit a control signal to the steering system 44 to turn or adjust a heading of the vehicle 12, and may transmit a control signal to the engine system 46 to speed up the vehicle 12 to a specified velocity, to maintain a specified velocity, and to shift gears, in accordance with the driving plan.

The remote server 14 may similar include a processor, memory, and non-volatile storage including data and software that, upon execution by the processor of the remote server 14, causes the remote server 14 to perform the functions, features, and processes of the remote server 14 discussed herein. The remote server 14 may have access to one or more autonomous databases 48, which may be maintained in the non-volatile storage of the remote server 14 or in an external persistent storage device accessible by the remote server 14, such as a network drive. The autonomous databases 48 may include up-to-date versions of the data stored in the non-volatile storage 22 of the controller 16, such as the cost function data 26, map data 34, and so on. Periodically, the controller 16 may be configured to query the remote server 14 via the communications module 36 to determine if its data is up to date. If not, the remote server 14 may be configured to transmit the up-to-date data to the vehicle 12 for inclusion in the non-volatile storage 22. Alternatively, responsive to an update to the autonomous databases 48 that is relevant to the vehicle 12, the remote server 14 may be configured to transmit the updated data to the vehicle 12.

Figure 2:
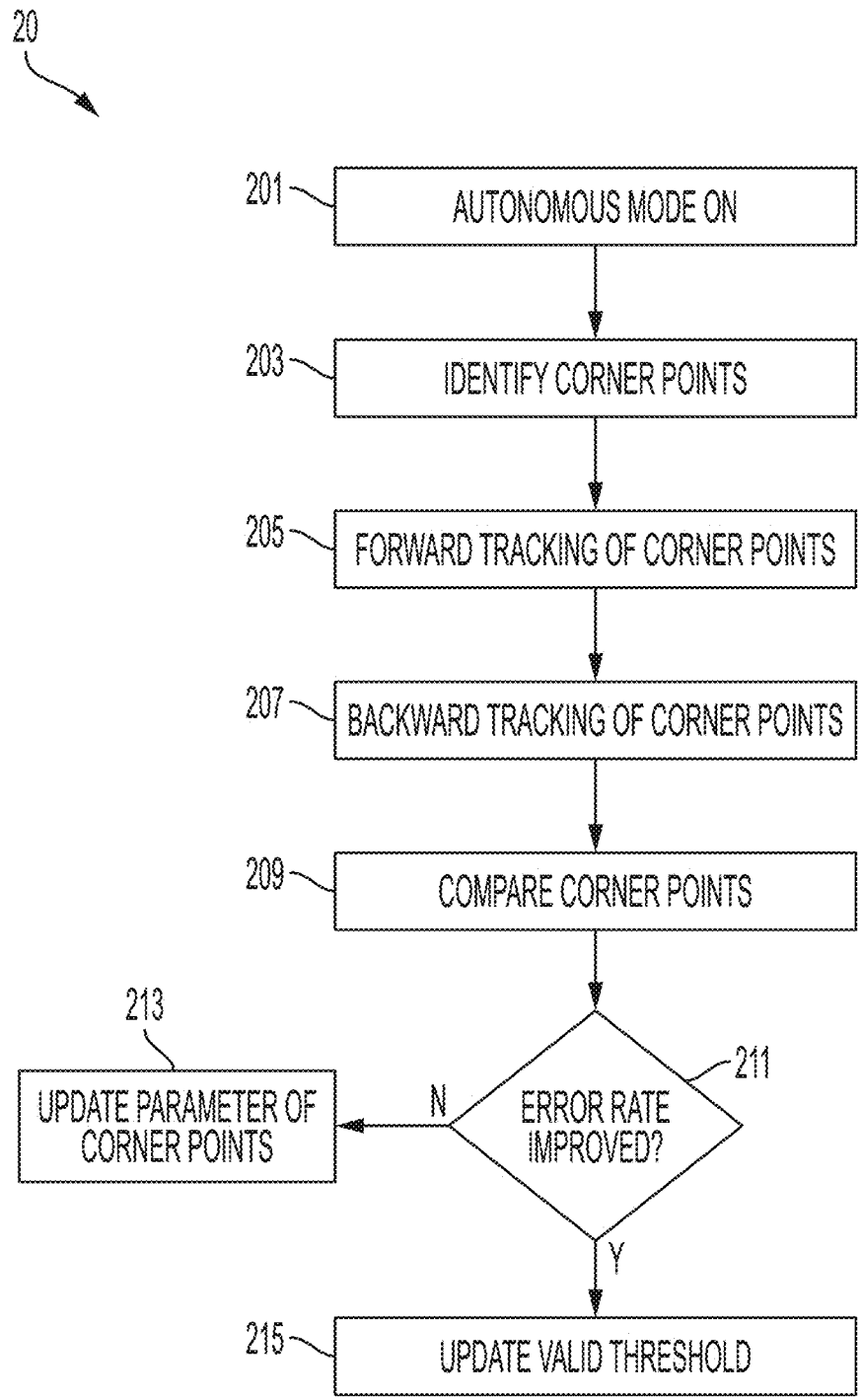
FIG. 2 discloses a flow chart 200 for utilizing visual odometry for forward tracking and backward tracking of corner points.

FIG. 2 discloses a flow chart 200 for a controller in an autonomous vehicle. The autonomous mode may be implemented in a test vehicle or a production vehicle that is utilized to improve the accuracy of an autonomous mode tracking algorithm or application. The flow chart of 200 may be implemented offline from a vehicle in a simulation scenario utilizing computers and digital data recording a path planned. The processor may utilize tracking of features from frame to frame. At each new frame, corners of the objects may be found utilizing a corner detector (such as a Harris corner detector). For example, two tangential sides of an object that meet may be identified as a corner point of an object by one or more sensors on the autonomous vehicle. A novel descriptor may be built around each corner in order to match the corner in subsequent frames.

At step 201, the vehicle controller may identify that it is in autonomous mode. When the autonomous mode is activated, the vehicle may not utilize human interaction to drive and maneuver along streets. The vehicle may rely on various sensors and applications (as explained in FIG. 1) to maneuver rather than utilizing a human to control the vehicle. The autonomous mode may be a fully autonomous mode with a vehicle that needs no human interaction or semi-autonomous mode that requires only some human interaction.

At step 203, the autonomous vehicle may identify corner points within a field-of-view of the vehicle. The autonomous vehicle may identify the corner points utilizing a camera or another sensor. The corner points may be identified by measuring two tangential sides of an object. The vehicle may identify a finite number or infinite number of corner points in each driving scenario. The corner points may be utilized to help identify an environment of a vehicle by identifying various objects. The corner points may be utilized to identify both dynamic objects (vehicles, pedestrians, animals, bicycles, etc.) that move and stationary objects (e.g. buildings, signs, roads, curbs, etc.) that do not move.

At step 205, the application may conduct forward tracking of one or more corner points. The application may identify one or more corner points in a specific video frame that is recorded by a camera or other vehicle sensor during autonomous operation. For each frame, the corner points location may be tracked and identified. During forward tracking, the application may start with a first frame that started the tracking and end with a last frame. At each instance of the frame, the application may identify the location for that corner point. The application may identify the start position at the first frame of the corner point and an end position of the corner point in the last frame. For example, the feature tracking may be started at a given frame then tracked for an N number of frames. The N number of frames may be designated by a user of the autonomous vehicle or testing system. The pixel coordinates of each point in the first frame may be saved off. The tracking algorithm's performance can then be measured by the error between the points when tracking ended and when it began. Points that have the same coordinates as when tracking started as when it ended may have no error.

At step 207, the application may conduct reverse tracking of one or more corner points. The application may identify one or more corner points in a specific video frame that is recorded by a camera or other vehicle sensor during autonomous operation. For each frame, the corner points location may be tracked and identified. During reverse tracking, the application may start with the last frame that was previous recorded and reverse track to the first frame. At each instance of the frame, the application may identify the location for that corner point. In reverse tracking, the application may identify the start position for the corner point of the last frame and an end position of the corner point in the first frame that may be digitally recorded and stored.

For example, the reverser feature tracking may have started at a given frame (e.g. the last frame) and then tracked for the N number of frames. The pixel coordinates of each corner point in each frame may be saved off. Once the first frame has been reached in reverse tracking, the current pixel locations are again taken and compared to the pixel coordinates that were originally saved off in forward tracking. Because there is noise and some error, the locations may be different when comparing the locations in forward tracking as opposed to reverse tracking. The tracking algorithm's performance can then be measured by the error between the points when tracking ended and when it began. Points that have the same coordinates as when tracking started as when it ended may have no error.

At step 209, the application may utilize the comparison to identify whether or not the error rate between the two locations of the corner points is accurate. The application may compare the offset of the pixels in the corner point during reverse tracking and forward tracking. In one example, a first corner point may have a location on a x-axis and y-axis as (100,100) when it is forward tracked. However, when it is reverse tracked or back tracked, the location may be (105, 105). The two locations may be compared and placed into an error matrix to determine the offset or error rate. For example, a Euclidean distance may be placed into the error matrix. If the coordinates of both the forward tracked corner point and reverse tracked corner point for the object or objects are equal, it can be assumed there is no error rate.

The vehicle may determine if the error rate is appropriate for the current corner points that are utilized at decision 211. As discussed above, the system may compare the offsets against a threshold error rate that is utilized to determine if the visual odometry needs to be improved. For example, the system might define a threshold of 95% (e.g. 5% offset) as a cut-off to continue using the descriptors of the corner points or to update the corner points. Of course, other error rates may be utilized. For example, a threshold of 98% or 90% may be utilized. As discussed above, a 100% threshold would mean there is no error or offset between the locations of the corner points when identified in forward tracking and reverse tracking.

If the location accuracy falls below the threshold, the system may update the parameters of the corner points at step 213. The corner points parameters or descriptors may be adjusted or changed if the accuracy falls below the threshold. The image may also be converted from the RGB (red, green, blue) color space to HSV (hue, saturation, value). This may be done as the HSV color space may be affected by lighting changes as much as RBG can be. Once converted to the HSV color space, the pixels in the annulus shape are sampled and stored for each corner. Next, a kd-tree (k-dimensional tree) may be built to match the corners in frame t and frame t+1. The kd-tree may be a data structure used for organizing the points in a space with k dimensions. It may be a binary search tree with other constraints that may be imposed on it.

If the location accuracy is above and exceeds the threshold, the system may update the parameters of the valid threshold at step 215. Thus, the system may continue to improve the accuracy of the visual odometry tracking utilizing the corner points. For example, the system might define a threshold of 95% (e.g. 5% offset) as a cut-off to continue using the descriptors of the corner points or to update the corner points. In an alternate embodiment, if the threshold is exceeded, the system may simply utilize the same threshold and continue to ensure that the accuracy of tracking the corner points is maintained through the process of flow chart 200.

The descriptors that may be utilized in the corner points. The descriptors may be in various shapes and sizes. The descriptors may be the pixel values that are in a specific region of a shape, such as a square, circle, rectangle, etc. The descriptors may be an input into the machine learning algorithm and be in various color spaces. Additionally, the descriptors may be any time of shape or size. For example, the square can be a window size and be variable by 30×30 pixels, 40×40 pixels, etc. The descriptors may also be a circle and have a radius that can be variable. For example, a circle descriptor may be 7 pixels, 8 pixels, 9 pixels, etc. Additionally, an annulus may be utilized as a descriptor. The annulus may be a radius of an outer circle and inner circle. The annulus may vary in different pixel sizes as well.

An RGB color space may be a typical image from a camera or sensor that is located on the vehicle. There may also be a HSV color space that can be converted from the RBG color space. The RGB image may be transformed to HSV to improve isolation of colors. In another embodiment, the system may utilize a lab color space that uses lightness and color-opponent dimensions. The RGB image may be transformed to LAB (e.g. CIELAB color space) to also better isolate colors than a typical RGB color space. Various color spaces may be utilized in different driving scenarios to determine which color space is best for accuracy in various scenarios. The system may utilize genetic programming for finding the best descriptor. The system may encode all parameters of the descriptor as a binary string. As such, the parameters of the descriptor may change in order to alter the tracking of the corner points.

Figure 3:
FIG. 3 discloses an example image of a frame from an autonomous vehicle camera overlaying corner points.

FIG. 3 discloses an example image detailed view of a corner point obtained from a frame from an autonomous vehicle camera overlaying corner points discloses an example image of a frame from an autonomous vehicle camera overlaying corner points. An autonomous vehicle may be equipped with a sensor, such as a camera, that may be utilized to identify corner points from various objects around the vehicle's environment. The corner points may be identified by measuring two tangential sides of an object. The corner points may be identified by a number by the vehicle controller. In one example, the vehicle controller may be limited to identifying a number of corner points, such as 1000 corner points. As shown in FIG. 3, the system may identify an image and an associated number of the corner points.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. An autonomous vehicle, comprising:
   a sensor configured to record video and identify one or more objects utilizing proximity data; and
   a controller in communication with the sensor and configured to perform the following functions:
   a. identify corner points in the recorded video of one or more objects utilizing the proximity data;
   b. identify a forward-tracked location of one or more corner points in each frame from an earlier first frame to a later frame of the recorded video played in forward;
   c. identify a reverse-tracked location of one or more corner points in each frame from the later frame to the earlier frame of the recorded video played in reverse;
   d. compare the forward-tracked location and reverse-tracked location of the one or more corner points; and
   e. adjust a descriptor defining characteristics of one or more pixels of the corner point in response to the comparison indicating an error rate exceeding a threshold.

2. The autonomous vehicle of claim 1, wherein the adjustment function includes changing an amount of pixels analyzed at the corner point.

3. The autonomous vehicle of claim 2, wherein the adjustment function includes increasing an amount of pixels analyzed at the corner point.

4. The autonomous vehicle of claim 2, wherein the adjustment function includes decreasing an amount of pixels analyzed at the corner point.

5. The autonomous vehicle of claim 1, wherein the adjustment function includes changing a shape of a region of the one or more pixels analyzed at the corner point.

6. The autonomous vehicle of claim 5, wherein the shape of the region of the one or more pixels includes a square.

7. The autonomous vehicle of claim 5, wherein the shape of the region of the one or more pixels includes an annulus.

8. The autonomous vehicle of claim 5, wherein the shape of the region of the one or more pixels includes a circle.

9. The autonomous vehicle of claim 1, wherein the controller is further configured to translate the corner points from a first color space to a second color space.

10. The autonomous vehicle of claim 9, wherein the first color space is an red-green-blue (RGB) space and the second color space is a hue-saturation-value (HSV) color space or cielab color space.

11. An autonomous vehicle of claim 1, wherein the one or more objects include a moving vehicle.

12. The autonomous vehicle of claim 1, wherein the one or more objects include a stationary object.

13. A method of analyzing autonomous vehicle data, comprising:
    recording a video of a vehicle environment utilizing one or more vehicle cameras;
    identifying corner points of objects in the video;
    identifying a forward-tracked location of one or more corner points in each frame from an earlier first frame to a later frame of the recorded video played in forward;
    identifying a reverse-tracked location of one or more corner points in each frame from the later frame to the earlier frame of the recorded video played in reverse;
    comparing the forward-tracked location of the earlier frame and reverse-tracked location of the later frame; and
    adjusting a descriptor defining characteristics of one or more pixels of the corner point in response the comparison indicating an error rate exceeding a threshold.

14. The method of claim 13, further comprising translating the one or more corner points from a first color space to a second color space.

15. The method of claim 14, wherein the first color space is a red-green-blue (RGB) space and the second color space is a hue-saturation-value (HSV) color space.

16. The method of claim 13, wherein the adjusting step includes changing a shape of a region of the one or more pixels analyzed at the corner point.

17. The autonomous vehicle of claim 16, wherein the shape of the region of the one or more pixels includes a circle.

18. The method of claim 16, wherein, wherein the shape of the region of the one or more pixels includes a square.

19. The method of claim 16, wherein the shape of the region of the one or more pixels includes an annulus.

20. A computer system, comprising:
    a storage medium including a recorded video collected from one or more vehicle sensors configured to identify one or more objects utilizing proximity data; and
    a processor in communication with the storage medium and programmed to:
    a. identify corner points in the recorded video of the one or more objects utilizing the proximity data;
    b. play the recorded video in forward and reverse;
    c. identify a forward-tracked location of one or more corner points in a earlier frame when the recorded video is played in forward from the earlier frame to a later frame;
    d. identify a reverse-tracked location of one or more corner points in the earlier frame when the recorded video is played in reverse from the later frame to the earlier frame;
    e. compare the forward-tracked location and reverse-tracked location of the one or more corner points; and
    f. adjust a descriptor defining a pixel of the corner point in response the comparison indicating a change of position of the one or more corner points.

* * * * *